May 30, 1939.  A. G. THOMAS  2,160,606
VISCOSITY ANALYZER
Filed April 9, 1937
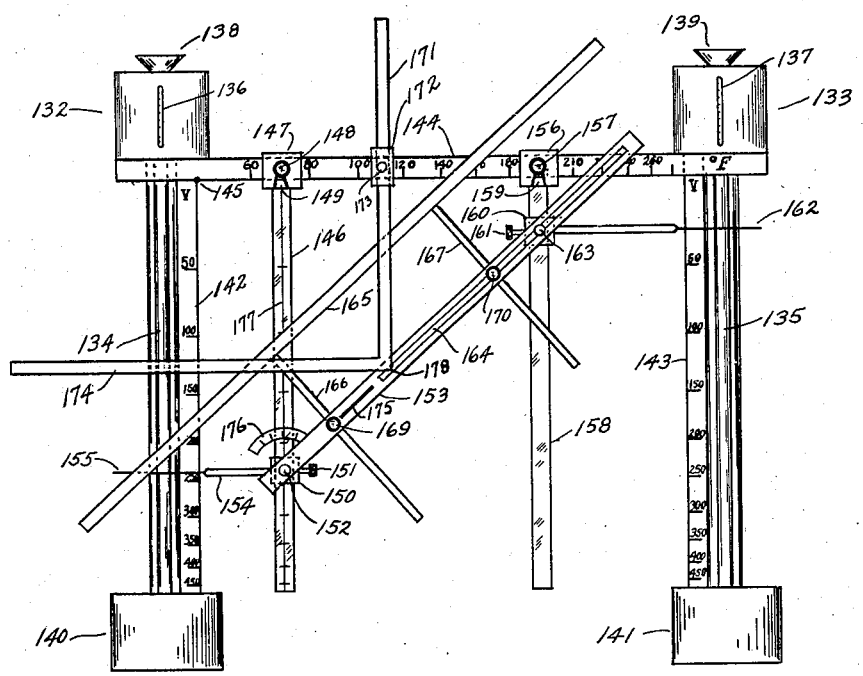
Albert G. Thomas
*Inventor*

Patented May 30, 1939

2,160,606

UNITED STATES PATENT OFFICE 2,160,606

VISCOSITY ANALYZER

Albert G. Thomas, Lynchburg, Va.

Application April 9, 1937, Serial No. 135,881

8 Claims. (Cl. 265—11)

This invention relates to viscosity testing devices.

An object is to provide a viscosity tester that will quickly show the slope of the viscosity-temperature curve of any oil so that the temperature of that oil corresponding to a definite viscosity may be quickly determined.

Other objects will appear in the following description.

In the drawing:

The figure is a front elevation of a viscosity graphic analyser by which the viscosity-temperature curve of an oil may be quickly determined.

In the figure viscosity testers 132 and 133 have inlet funnels 138 and 139, thermometers 136 and 137 showing the temperatures of the liquid under test, transparent tubes 134 and 135 and bases 140 and 141 respectively. These testers are based upon the general principles as outlined in my Patent No. 2,022,578. The liquid under test rises in the transparent tubes and stops at a level in inverse relation to the viscosity of the liquid. The less the viscosity the higher the liquid will rise in tubes 134 and 135 before the timed valve stops the flow.

Vertical scale 142 adjacent tube 134 is laid off so that it is a logarithmic scale of viscosity, the lower the position on the scale the higher the viscosity. Scale 143 adjacent to tube 135 is a duplicate of scale 142 and occupies the same relative position to tube 135 that scale 142 does to tube 134.

Horizontal scale 144 connects testers 132 and 133 and is a logarithmic scale of temperature, the zero point being at 145 which may also be the origin of the viscosity scale. Therefore the right hand edge of scale 142 and the lower edge of scale 144 represent ordinates and abscissae respectively of a graphical system.

Rectangular rod 146 is fastener to slide 147 having a slot through which scale bar 144 passes. Thumb screw 148 may be tightened to clamp slide 147 and rod 146 in any desired horizontal position. Open gap 149 is left in slide 147 so that an index directly beneath the center of thumbscrew 148 may be set at any desired temperature mark on scale 144. Slide 150, with rectangular slot is vertically movable on rod 146 and has thumbscrew 151 which may be tightened to clamp slide 150 in any vertical position relative to scale 142. Pivot 152 passing through a hole in rectangular bar 153, is fastened to slide 150 and is in a vertical line from the index on slide 147. Thin pointer 155 is attached to arm 154 which is fastened to slide 150. Pointer 155 is on the same vertical level as pivot 152 so that this pivot may be adjusted to the same level as the level of the liquid in tube 134, by moving slide 150 and pointer 155 vertically until this pointer passes through the meniscus of the liquid column in tube 134. Thumbscrew 151 may then be tightened to clamp slide 150 on rod 146 at the proper level.

Rectangular rod 158, slide 156, thumbscrew 157, gap 159 with index, and slide 160 with thumbscrew 161, and pointer 162 are constructed and related in similar manner and pivot 163, fastened to slide 160, is directly beneath the index on slide 156 and works in slot 164 in bar 153 so that this bar may be turned about pivot 152 and placed at any angle. Pointer 162 serves to place pivot 163 at the same level as the meniscus of the liquid in tube 135. Slide 156 is movable along scale 144 and may be clamped in any horizontal position.

Long bar 165 is fastened to rods 166 and 167 which are slidable in holes in bar 153 and may be clamped by thumbscrews 169 and 170 threaded into bar 153. Bar 165 is arranged so that it is always parallel to bar 153.

Leg 171 is vertically movable in slide 172 which may be moved on scale 144 or on a separate guide bar, parallel to scale 144, so that slides 147 and 156 cannot interfere. Leg 171 is integral with horizontal leg 174 at right angles to leg 171. Thumbscrew 173 threaded into slide 172 serves to clamp leg 171 in any desired position relative to slide 172 or scale 144. Arcuate scale 176 is fastened to bar 153 and is calibrated to indicate the angle between this bar and the vertical mid-line 177 of rod 146. The scale 176 may be calibrated in degrees or in designations indicating various bases of oils.

In operation if it is desired to obtain the logarithmic viscosity-temperature curve of a petroleum oil, which curve is a straight line, the cup of tester 132 will be filled through funnel 138 with oil at one temperature and the cup of tester 133 will be filled through funnel 139 with the same kind of oil at a higher temperature. The two viscosity testers are then made to run practically simultaneous tests for the same time interval and therefore the oil will stop at a lower level in tube 134 than in tube 135, since the temperature of the oil tested in the latter case is higher. Then the temperature of the oil in tester 132 is read on thermometer 136 and the index on slide 147 is set and clamped at a reading on scale 144 to correspond to the reading of thermometer 136. Similarly the index on slide 156 is set to register with a mark on temperature scale 144 to correspond to the reading of thermometer 137 at the time of the test. The two slides are then clamped in position by means of thumbscrews 148 and 157 and slide 150 is clamped on rod 146 so that pointer 155 and therefore pivot 152 is level with the top of the oil column in tube 134. Similarly slide 160 is clamped on rod 158 so that pivot 163 is level with the top of the oil column in tube 135. The angular position that rod 153 makes with rod 146 will then show the slope of the viscosity-temperature curve for the oil tested.

Now if it is desired to find the temperature corresponding to a definite viscosity of the oil it is necessary only to loosen thumbscrew 173 and to move leg 174 downward until its lower edge registers with the desired viscosity calibration on scale 142. Thumbscrew 173 is then tightened to clamp leg 171 which is then moved horizontally by means of slide 172 until corner 178 touches the mid-line of bar 153. An extended flange 175 may be fastened to bar 153 and may be continued for the length of the bar to act as a mid-line stop for corner 178. When corner 178 touches the mid-line of bar 153 the corresponding temperature may be read at the intersection of the right hand edge of leg 171 with scale 144. Similarly viscosities corresponding to various temperatures may be obtained.

In case the slope of the curve is known only one viscosity test need be made, with tester 132 preferably. Then rod 146 is adjusted on scale 144 to register with the mark corresponding to the temperature of the test and pointer 155 is clamped to indicate the proper viscosity level. Then bar 153 is turned about pivot 152 until scale 176 indicates the known angle with reference to the mid-line 177. Then legs 171 and 174 may be manipulated as before to obtain temperatures or viscosities.

In practice a series of tests on various fractions of a petroleum oil of one base may be desired, in which case the slope of bar 153 would be unchanged. Then bar 165 may be moved parallel to bar 153 until the upper edge of bar 165 intersects the mid-line 177 of rod 146 at various viscosities as obtained from scale 142. Rod 146 may be calibrated identically with scale 142. Then various temperatures and viscosities for each fraction may be read by moving corner 178 until it touches or is level with the top edge of bar 165. This may be done for each position of bar 165. Bar 165 is of course not essential but may be a convenience. Legs 171 and 174 may be calibrated in viscosity units and temperatures, if desired.

It is not essential to have two testers since two consecutive tests can be run at different temperatures in one tester and the slides 150 and 160 can be set correspondingly. The two testers make for speed of operation however. After the tests the machines are drained and made ready for another test.

A bar similar to bar 165 may be fastened to the lower ends of rods 166 and 167 so that readings may be made on either side of bar 153.

In order to have scales 142 and 143 logarithmic it will be necessary to have tubes 134 and 135 ground with varying cross section to accomplish this result since this type of tester normally gives a geometric scale, using a tube of uniform cross section. Instead of grinding the tube it is possible to use a rod-like filler of varying cross section as illustrated in my Patent No. 2,091,922 issued Aug. 24, 1937.

If desired, scales 142 and 143 may be normally calibrated in Saybolt seconds and the viscosity readings may be transferred to a logarithmic viscosity-temperature chart. The slope of the curve can then be determined by drawing a line through the two points and parallel lines may then be drawn to determine viscosity-temperature relations for that oil. If the slope of the curve is already known it is necessary to run only one test.

The graphical analyzer as illustrated makes it possible quickly to determine viscosity-temperature relations of any liquid for which the viscosity-temperature curve is a straight line when the variables are logarithmically calibrated.

What I claim is:

1. A viscosity testing device comprising a pair of spaced parallel viscosity scales, a temperature scale bridging the viscosity scales, a pair of members slidably adjustable along the temperature scale to points corresponding with the temperatures at which the viscosity readings are taken, a slider mounted upon each of said temperature members and each adapted to be positioned in accordance with the viscosity indication upon its respective viscosity scale, a bar extending across said temperature members and slidably and pivotally connected to said sliders to assume an inclined position indicative of the slope of the temperature-viscosity curve.

2. A viscosity testing device comprising a viscosity scale, a temperature scale placed at an angle to said viscosity scale, a pair of members slidably adjustable along said temperature scale to points corresponding with the temperatures at which the viscosity readings are taken, a slider mounted upon each of said temperature members and each said slider adapted to be positioned in accordance with the viscosity indication corresponding to the respective temperatures of the tests, a bar extending across said temperature members, said bar being pivotally connected to one of said sliders and adapted to be positioned by the other said slider to assume an inclined position indicative of the slope of the temperature-viscosity curve of the liquid tested in said device.

3. A viscosity testing device comprising: a viscosimeter of the type in which the liquid rises in a vertical column to a height proportional to the viscosity, a viscosity scale associated with said column, a temperature scale projecting laterally from said column, a pair of parallel members movable along said temperature scale, an element movable along the length of one of said members, another element movable along the length of the other said member, said elements being adapted to be placed in positions relative to said viscosity scale according to two respective viscosity indications, and a bar extending across said members and pivoted to at least one of said movable elements.

4. In combination, a pair of viscosity testing devices for liquid, a pair of parallel logarithmic viscosity scales, a logarithmic temperature scale situated at an angle relative to said viscosity scales, a pair of parallel elements at an angle to said temperature scale and settable relative to said scale in accordance with the temperatures of the respective viscosity tests, and a member bridging said parallel elements and settable along the lengths of said elements in accordance with the respective readings of said viscosity devices.

5. A viscosity testing device including a viscosity scale, a temperature scale placed at an angle to said viscosity scale, a pair of members settable with reference to said temperature scale to points corresponding with the temperatures at which the viscosity readings are taken, an element mounted on each of said temperature members and each said element adapted to be positioned in accordance with the viscosity indication corresponding to the respective temperatures of the tests, a bar extending across said temperature members, said bar being adapted to be positioned by said elements to assume an inclined position indicative of the slope of the temperature-viscosity curve of the liquid tested in said device.

6. A viscosity testing device including a viscosity scale, a temperature scale placed at an angle to said viscosity scale, a pair of members settable with reference to said temperature scale to points corresponding with the temperatures at which the viscosity readings are taken, an element mounted on each of said temperature members and each said element adapted to be positioned in accordance with the viscosity indication corresponding to the respective temperatures of the tests, a bar extending across said temperature members, said bar being adapted to be positioned by said elements to assume an inclined position indicative of the slope of the temperature-viscosity curve of the liquid tested in said device, and a movable transfer element with one leg parallel to said viscosity scale and the other leg parallel to said temperature scale, said transfer element being adapted to correlate readings on one scale with readings on the other scale, in conjunction with the position of said bar.

7. Same as in claim 5 but with the temperature scale at right angles to the viscosity scale.

8. Same as in claim 5 but with a logarithmic temperature scale and a logarithmic viscosity scale.

ALBERT G. THOMAS.